Patented Aug. 25, 1936

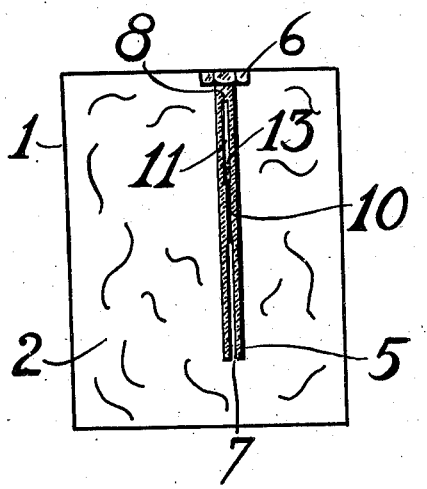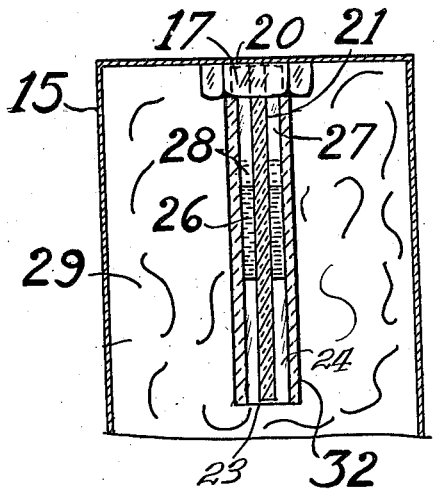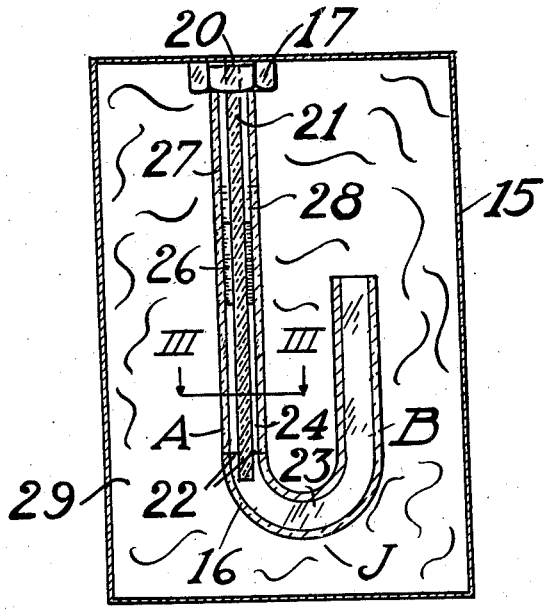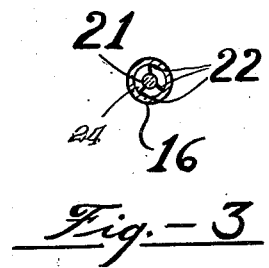

2,052,185

UNITED STATES PATENT OFFICE 2,052,185

CAPILLARY LIQUID COLUMN GRAVITY METER

William B. Lewis, Houston, Tex., assignor to Standard Oil Development Company, a corporation of Delaware Application February 21, 1935, Serial No. 7,508

8 Claims. (Cl. 265—1.4)

This invention relates to improvements in constant temperature liquid column gravity meters.

It has been customary in barometer gravity meters previously used to provide a U tube partly filled with mercury. Differences in the force of gravity have been determined by reading the differences in the heights of the mercury levels in the two legs of the U tube at different stations. A gravity difference of $10^{-4}$ dynes produces a change in the difference of the heights of the two mercury levels of the U tube of about $10^{-6}$ centimeters or less than a wave length of visible light. The sensitivity of the barometer gravity meter has been fixed and cannot be increased by variations in the design of the instrument.

It is an object of this invention to provide a constant head liquid column gravity meter of high sensitivity.

Other objects will be apparent from the specification taken in connection with the accompanying drawing in which latter—

Fig. 1 is a vertical sectional view of the device;

Fig. 2 is a vertical sectional view of a modified form of the device;

Fig. 3 is a transverse sectional view taken along the line III—III of Fig. 2; and Fig. 4 is a vertical sectional view of still another modified form of the device.

Referring particularly to Fig. 1 of the drawing, reference numeral 1 designates a container or reservoir adapted to contain gas 2 such as air or the like. A tube 5 is supported in vertical position within the reservoir 1 by means of a nut 6. The tube is provided with a relatively fine bore 7 which is closed at the upper end 8 of the tube and which opens at its lower end into the reservoir 1. The tube 5 may be a capillary tube. Preferably the tube 5 is made of glass. A thread of mercury 10 is disposed in an intermediate portion of the bore 7 and is supported by the body of air 2. The portion of the interior of the tube 5 above the upper level of the column of mercury 10 constitutes a chamber 11 which preferably contains a small quantity such as two or more drops of compensating liquid 13. Alternatively the chamber 11 may be evacuated and some of the advantages of the invention will be retained.

Changes in temperature of the atmosphere surrounding the apparatus cause changes in the dimensions of the apparatus, the density of the liquid 10 and the pressure of the gas 2. Changes in the pressure of the gas are the most serious source of error. The compensating liquid 13 must have a small difference between its vapor pressure and the product of the temperature and the change of vapor pressure with temperature in order that the mercury thread 10 may be short in length. A preferred compensating liquid is cymene for which the mercury thread may be about 12 centimeters long. Other compensating liquids which may be used are carbon tetrachloride, chloroform, carbon bisulfide or the like. In the gravity meter described, gravity differences change the position of the mercury thread 10 in the bore 7. The sensitivity of the instrument is proportional to the ratio of the volume of the air space 2 to the cross section of the bore 7. This ratio can be made very large. For example, the diameter of the bore 7 can be made say one millimeter, while the volume of the air space 2 can be made 30,000 cubic centimeters. The sensitivity of the readings would then be 30,000 divided by .003 or approximately ten million. A difference in gravity of $10^{-4}$ dynes would then change the position of the mercury thread by one centimeter.

Referring to Figs. 2 and 3, a modified form of the device is shown comprising a closed reservoir or container 15. A substantially J shaped tube 16 is supported within the container 15 in vertical position by means of a nut 17. The J shaped tube comprises a long arm A and a short arm B. The arm A of tube 16 is closed at its upper end 20 and this arm of the tube contains a rod 21 of glass or the like which is supported by braces 22 in spaced relation to the walls of the tube 16. The glass rod 21 is so proportioned in size with respect to the bore 23 of the tube that the space 24 surrounding the rod 21 is of capillary size. The tube 16 and rod 21 form a tube having an annular bore of capillary size. A thread of mercury 26 is disposed around the glass rod 21 and terminates in spaced relation to the closed end 20 of the tube to form a chamber 27 adapted to receive compensating liquid 28. The compensating liquid 28 may consist of two or more drops of cymene, carbon tetrachloride or the like. Alternatively the chamber 27 may be evacuated and some of the advantages of the invention will be retained. The short arm B of the tube 16 opens into the gas reservoir 15 which contains air 29 or the like.

Referring to Fig. 4 of the drawing, a modified form of the structure illustrated in Figs. 2 and 3 is illustrated in which a straight vertically disposed tube 32 is substituted for the substantially J shaped tube 16. Otherwise the apparatus is identical with that illustrated in Figs. 2 and 3, and like reference numerals have been used to designate like parts. The device comprises a container 15 adapted to contain gas 29. The tube 32 is supported in vertical position within the reservoir 15 by means of a nut 17. The bore of the tube is closed at its upper end and opens at its lower end into the reservoir 15. Preferably the tube 32 is made of glass. The tube contains a rod 21 of glass or the like which is suitably supported in spaced relation to the walls of the tube. The glass rod 21 is so proportioned in size with respect to the bore 23 of the tube that the annular space 24 surrounding the rod 21 is of capillary size. A thread of mercury 26 is disposed around the glass rod 21 and terminates in spaced relation to the closed end 20 of the tube to form a chamber 27 adapted to receive compensating liquid 28. The tube 32 and rod 21 form a tube having an annular bore of capillary size.

Various changes may be made within the scope of the appended claims in which it is desired to claim all novelty inherent in the invention as broadly as the prior arts permits.

I claim:

1. A liquid column gravity meter, comprising a closed system including a container for gas, an upright capillary tube opening at its lower end into the container and closed at its upper end, and a column of mercury of constant head filling an intermediate portion only of the tube and supported by the gas.

2. A liquid column gravity meter, comprising a closed system including a container for gas, an upright tube closed at its upper end and opening at its lower end into the container, a rod disposed in the closed end of the tube in spaced relation to the walls of the tube to form an annular chamber, and a thread of mercury of constant head disposed in an intermediate portion only of the annular chamber and supported by the gas.

3. A liquid column gravity meter, comprising a closed system including a closed container for gas, an upright capillary tube enclosed by the container closed at its upper end and opening at its lower end into the container, a column of mercury of constant head filling an intermediate portion only of the tube and supported by the gas, and a body of compensating liquid in the tube supported by the upper end of the column of mercury exerting pressure upon the column by its saturated vapor pressure to prevent changes in position of the column due to changes in temperature.

4. A liquid column gravity meter according to claim 3 in which the compensating liquid is cymene.

5. A liquid column gravity meter, comprising a closed system including an upright capillary tube containing an upright column of mercury of constant head, a chamber containing a body of compensating liquid opening upon and exerting pressure upon the upper end of the column by its saturated vapor pressure, a chamber containing a body of gas supporting the lower end of the column under pressure such that the gas pressure changes with temperature at the same rate as the vapor pressure of the compensating liquid whereby the mercury column is motionless upon change in temperature.

6. A liquid column gravity meter, comprising a closed system including a container for gas, and an upright capillary tube opening at its lower end into the container and closed at its upper end, and a column of mercury of constant head filling an intermediate portion only of the tube and supported by the gas, the portion of the tube above the column of mercury being partially evacuated.

7. A liquid column gravity meter, comprising a closed system including a container for gas, an upright tube having an annular bore of capillary size opening at its lower end into the container and closed at its upper end, and a column of mercury of constant head filling an intermediate portion only of the tube and supported by the gas.

8. A liquid column gravity meter, comprising a closed system including a closed container for gas, an upright tube having an annular bore of capillary size closed at its upper end and opening at its lower end into the container, a column of mercury of constant head filling an intermediate portion only of the tube and supported by the gas, and a body of compensating liquid in the tube supported by the upper end of the column of mercury exerting pressure upon the bore by its saturated vapor pressure to prevent changes in position of the column due to changes in temperature.

WILLIAM B. LEWIS.